（12） United States Patent
Kellers et al.

(10) Patent No.: US 10,162,324 B2
(45) Date of Patent: Dec. 25, 2018

(54) METHOD FOR MANIPULATING A CONTROL PROGRAM OF A CONTROL DEVICE

(71) Applicant: dSPACE digital signal processing and control engineering GmbH, Paderborn (DE)

(72) Inventors: Bastian Kellers, Paderborn (DE); Marc Dressler, Horn-Bad Meinberg (DE); Thorsten Hufnagel, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 250 days.

(21) Appl. No.: 15/177,372

(22) Filed: Jun. 9, 2016

(65) Prior Publication Data

US 2016/0282831 A1    Sep. 29, 2016

Related U.S. Application Data

(63) Continuation of application No. PCT/EP2014/076067, filed on Dec. 1, 2014.

(30) Foreign Application Priority Data

Dec. 9, 2013 (DE) .......................... 10 2013 113 686
Dec. 9, 2013 (EP) ...................................... 13196219

(51) Int. Cl.
*G05B 19/04* (2006.01)
*G05B 19/042* (2006.01)
(Continued)

(52) U.S. Cl.
CPC ........... *G05B 19/0426* (2013.01); *G06F 8/30* (2013.01); *G06F 11/30* (2013.01); *G05B 2219/23344* (2013.01)

(58) Field of Classification Search
CPC ...... G05B 19/0426; G05B 2219/23344; G06F 11/30; G06F 8/30
See application file for complete search history.

(56) References Cited

U.S. PATENT DOCUMENTS 6,785,883 B1    8/2004   Slomak
8,074,118 B2   12/2011   Dressler et al.
(Continued)

FOREIGN PATENT DOCUMENTS

CN    1337024 A      2/2002
CN    101300545 A   11/2008
(Continued)

OTHER PUBLICATIONS

Chinese Office Action for Chinese Application No. 201480051803.8 dated Feb. 27, 2018 with English translation.
(Continued)

*Primary Examiner* — Jason Lin
(74) *Attorney, Agent, or Firm* — Muncy, Geissler, Olds & Lowe, P.C.

(57) ABSTRACT

A method for manipulating a first function of a control program of an electronic control device, using a second function. The control program is processed using a first calculation kernel of a processor, and the second function is processed by a second calculation kernel during the processing of the control program. The first function assigns a first value to a variable and writes the first value to the storage address of the variable at a first time. The second function assigns a second value to the variable, which value is written to the storage address of the variable at a second time, wherein the second value written by the first function is overwritten. At a third time, the control program reads the second value from the storage address of the variable. A
(Continued)

control entity coordinates the times at which the storage address of the variable is accessed.

17 Claims, 7 Drawing Sheets

(51) Int. Cl.
*G06F 8/30* (2018.01)
*G06F 11/30* (2006.01)

(56) References Cited

U.S. PATENT DOCUMENTS

| | | | |
|---|---|---|---|
| 8,626,395 | B2 | 1/2014 | Dressler |
| 8,645,918 | B2 | 2/2014 | Leinfellner et al. |
| 9,047,409 | B2 | 6/2015 | Dressler et al. |
| 2003/0074650 | A1 | 4/2003 | Akgul et al. |
| 2005/0289286 | A1* | 12/2005 | Ohwada ............... G06F 9/5083 711/1 |
| 2007/0104204 | A1 | 5/2007 | Brokenshire et al. |
| 2008/0065239 | A1* | 3/2008 | Leinfellner ........ G05B 19/0423 700/34 |
| 2009/0132059 | A1* | 5/2009 | Schultz ................. G05B 19/05 700/7 |
| 2009/0210069 | A1 | 8/2009 | Schultz et al. |
| 2010/0192016 | A1* | 7/2010 | Dressler ............. G06F 11/3656 714/32 |
| 2012/0233446 | A1 | 9/2012 | Gammel et al. |
| 2017/0177345 | A1* | 6/2017 | Ould-Ahmed-Vall ...................... G06F 9/30029 |

FOREIGN PATENT DOCUMENTS

| | | |
|---|---|---|
| CN | 102708013 A | 10/2012 |
| CN | 103106145 A | 5/2013 |
| DE | 10 2004 027 033 A1 | 10/2005 |
| DE | 10 2011 052 511 A1 | 2/2013 |

OTHER PUBLICATIONS

International Search Report for International Application No. PCt/EP2014/076067 dated Feb. 18, 2015 with English translation.
German Search Report for German Application No. 10 2013 133 686.9 dated Jul. 3, 2014 with English translation.
IBM (IP.com), Method to Provide Exclusive Access to a Shared I2C Bus Resource (I2C MUTEX), pp. 1-2 (Jun. 21, 2003).
Gebhardt et al., "Development and Testing of ECU functions the bypass method: Open Heart Surgery," Elektroniknet, found at: http://www.elektoniknet.de/automotive/technik-know-how/test-entwicklungstools/article/1129/0, pp. 1-7 (Oct. 6, 2008) with English translation.

* cited by examiner

METHOD FOR MANIPULATING A CONTROL PROGRAM OF A CONTROL DEVICE

This nonprovisional application is a continuation of International Application No. PCT/EP2014/076067, which was filed on Dec. 1, 2014, and which claims priority to European Patent Application No. 13196219.3, which was filed in Europe on Dec. 9, 2013, and German Patent Application No. 10 2013 113 686.9, which was filed in Germany on Dec. 9, 2013, and which are all herein incorporated by reference.

BACKGROUND OF THE INVENTION

Field of the Invention

The invention relates to a method for manipulating a control program of a control unit.

Description of the Background Art

Control units are used in large numbers in many technical fields. Among many fields of application, an especially important one is engine control, transmission shift control, and chassis control for automobiles, and the control of engines for aircraft. Oftentimes it is necessary to modify the program code stored on a programmed and operational control unit, for example in order to replace, for test purposes, a first program routine stored in the program code by a second routine with modified or expanded functionality. If the source code of the program code is not available, it is necessary to manipulate the binary code stored on the control unit in order to do so. One method for this purpose is known from DE 10 2004 027 033 A1, which corresponds to U.S. Pat. No. 8,645,918, and which is incorporated herein by reference.

Another prior art method consists in incorporating the second program routine into the control program in such a manner that it is executed by the same processor core that executes the first program routine. One disadvantage of this method is that processing of the control program is held up by the additional load on the processor core.

Another prior art method consists in having the second program routine executed by a second processor core housed outside of the control unit, for example in a manipulation device connected to the control unit. It allows parallel processing of the second program routine. Disadvantages of this method are the additional hardware complexity required for its implementation and the higher latencies in the data exchange between the second program routine and the control program.

In addition, the technical article, *"Operation am offenen Herzen,"* (Elektroniknet.de, Oct. 6, 2008, http://www.elektroniknet.de/automotive/technik-know-how/test-entwicklungstools/article/1129/0/Operation_am_offenen_Herzen/) mentions the possibility of parallel execution, internal to the control unit, of the second program routine in a control unit with multiple processor cores.

One possibility for rapidly overwriting variables in a control unit is described by the U.S. Pat. No. 8,074,118 B2, which is incorporated herein by reference.

A general disadvantage of the methods known from the prior art for manipulating a control program of a control unit is that carrying them out requires changing the control program, either at the source code of the control program or at its machine code.

Control programs are generally modular in structure, which is to say they are formed of pre-made functions that are joined together into a control program, in particular using the principle of graphical programming. Accordingly, both the first program routine and the second program routine can generally be understood as a function or a combination of multiple functions.

SUMMARY OF THE INVENTION

Against this background, the object of the invention is to specify a method for manipulating a control program of a control unit that advances the state of the art.

According to an exemplary embodiment of the invention, a method is provided for manipulating a control program of a control unit. The control unit has a first memory for accommodating the control program, and the control program has a plurality of first functions, wherein at least one of the first functions is designed for controlling an actuator. In addition, a plurality of variables are provided, wherein a memory address is assigned to each of the variables, and a predefined assignment is implemented between the variables and the first functions. The control unit has at least one processor, wherein the processors of the control unit as a whole have a plurality of computing cores, and the control program with the first functions is executed in a first computing core. According to the invention, during execution of the control program, a second function is processed in a second computing core of the control unit, wherein a first function assigns a first value to a variable at a specific memory address, and writes the first value into the memory address of the variable at a first point in time, the second function assigns a second value to the same variable, the variable is overwritten with the second variable at a second, later point in time, and at a third, still later point in time, the control program accesses the modified value of the variable.

The second function can have a program code that is different at least in part from the first function. A control instance may be provided that time-coordinates the accesses to the memory address of the variable with one another, which is to say the read and write accesses to the memory addresses of the variable by the control program and by the second function, such that the first point in time falls before the second point in time and the second point in time falls before the third point in time.

A control instance can be a program routine that time-coordinates the execution of the second function by the second computing core with the processing of the control program by the first computing core. The control instance can be implemented as hardware, software, or a combination of the two. Its tasks primarily include initiation of the processing of the second function at a predefined point in time so that the processing of the first function and of the second function take place at least partly in parallel, in particular at the same time as the start of processing of the first function, and protection of data consistency. In order to ensure data consistency, the control instance is at least configured to time-coordinate the overwriting of the variable with the second value with the processing of the control program by the first computing core in such a manner that the overwriting of the variable with the second value occurs chronologically after the last write access to the variable by the first function, but before the first read access of the variable by the control program after the processing of the first function. Exemplary embodiments of the invention provide additional measures for ensuring data consistency by the control instance, in particular in such a manner that the control instance ensures that variables that are read in and utilized by both the first function and the second function, or that are passed to both functions as arguments, are passed to both functions with consistent values.

It is an advantage of the method according to the invention that, on the one hand, it can be implemented with little hardware complexity since processing of the second function is accomplished by processor resources internal to the control unit, and on the other hand, because of the parallel processing of the second function on a second processor core, the processing of the control program by the first processor core is held up only minimally. It is immaterial here whether the second computing core is not tasked with the processing of the control program from the outset, or whether the control unit is appropriately manipulated in such a way prior to execution of the method according to the invention. For example, one computing core could initially be tasked for safety reasons with a redundant execution of the control program that is not needed during the development process, and that consequently is switched off within the framework of the development process in order to carry out the method according to the invention.

In an embodiment of the invention, the control instance can be implemented at least in part through a monitoring program that is executed on a different computing core from the first computing core in parallel with the control program of the control unit. In this context, the different computing core can be a computing core of the control unit or can be a computing core arranged outside the control unit, for example a computing core housed in a monitoring or interface unit connected to the control unit.

In another embodiment of the invention, the control instance can be implemented at least in part through an additional program part that is integrated into the program code of the control program as a supplement and is executed by the first processor core, in particular through at least one service routine integrated into the control program as a supplement. It is immaterial here whether the additional program part is implemented as early as in the initial programming of the control unit at the source code level, or inserted into the binary code of the control program later using methods known from the prior art. In any case, the additional program part is not a part of the control program insofar as the control program would be executable and functional even without the additional program part.

In another embodiment of the invention, the control instance can be implemented at least in part through a monitoring unit that can be connected to the control unit, for example, through a monitoring unit realized as an interface unit. An interface unit can be a unit that is configured to establish a data connection between the control unit and another computer system, for example a PC for programming or configuring the control unit.

If the control instance is not implemented in the form of an additional program part, it should be configured to monitor the first computing core during processing of the control program in order to time-coordinate the processing of the second function with the processing of the control program. Preferably it is equipped to monitor the work of the first processor core through a data interface of a processor. A data interface can be an interface of a processor that can be read out by a second computing core or a monitoring unit, and that outputs data from which it is possible to draw conclusions concerning the memory address currently being processed by the first computing core, for example, an interface for monitoring the program counter, a trace interface, or a debugging interface.

In an embodiment of the invention, the control instance can be configured to detect, through the data interface of a processor, calls or terminations of functions of the control program and to start the second function at the same time as the first function so that parallel processing of the first function and second function takes place.

In an embodiment, the control instance can be configured to detect, through the data interface, processing in progress of functions of the control program. For example, it is possible that the transmission rate of the data interface is too low to precisely detect the point in time of the call to a first function. If, for example, the processor is only configured to communicate the processing of every tenth memory address of the control program through the data interface, it is not possible for the control instance to ascertain the exact point in time of the call of a specific first function. However, it can determine whether the first function was called within the last ten processed memory addresses and, if that is the case, start the processing of the second function by the second computing core. In addition, it is possible that the control instance recognizes the processing in progress of a function of a control program on the basis of an event uniquely linked to the function, for example on the basis of an access to a variable that is accessed only by the function, or on the basis of the point in the processing of the program code being reached where the function is stored in the memory of the control unit.

In an embodiment of the invention, the control instance can be configured to recognize the termination of the first function and, after termination of the first function, to cause the variable to be overwritten with the second value.

The processing of the second function may be initiated by the second computing core through a trigger signal, for example such that the second computing core processes an infinite loop, in each pass of the loop checks for the presence of the trigger signal, and if the result of the check is positive, starts processing of the second function. In an embodiment, the trigger signal can be activated from within the control program. In this embodiment, an event that can be uniquely assigned to the first function, for example the overwriting of a specific variable or the activation of a specific I/O pin, may serve as trigger. In an embodiment, the trigger signal can be activated by the control instance. In this embodiment, the activation of a trigger variable stored specifically for this purpose, or the activation of a specific register of the processor, may serve as trigger.

In an embodiment, the control instance initiates processing of the second function by the second computing core through setting of the program counter of the second computing core. For example, as long as the second computing core is not processing the second function, it can be tasked with the processing of an infinite loop, and the control instance initiates the processing of the second function by setting the program counter of the second computing core to a memory address at which is stored the start of the second function or a call to the second function.

The control instance can be configured to recognize the call to the first function by the first computing core and to initiate processing of the second function by the second computing core immediately after the call to the first function, or to recognize the return from the function preceding the first function in the control program and to initiate processing of the second function by the second computing core immediately after execution of the return, or to recognize processing in progress of the first function by the first computing core and to initiate processing of the second function by the second computing core immediately after recognizing the processing in progress of the first function by the first computing core, so that the first function and the second function are processed at least partly in parallel.

In an embodiment, the second function is processed in parallel by multiple second computing cores. Especially when the processing of the second function by the second computing core alone would take longer than the processing of the first function by the first computing core and the second function is constituted such that parallel processing of the second function by multiple computing cores is possible while maintaining data consistency, provision can be made to distribute the second function over multiple second computing cores and have it processed by multiple second computing cores in parallel. Preferably the control instance is configured to control the distribution of the second function over one or more computing cores.

In order to ensure that, after processing of the first function, the control program does not access the value of the variable until after the variable has been written with the second value calculated by the second function, provision is made in one embodiment of the invention that the control instance delays the execution of the control program by the first processor core, in particular briefly halts the processing of the control program after processing of the first function. For example, provision can be made that the control instance briefly halts the first processor core or, by means of an interrupt, causes the first processor core to process an endless loop and terminates the interrupt after the second function has written the second value to the variable. In another embodiment, the control instance is configured to choose the second point in time such that overwriting of the variable with the second value takes place immediately after the writing of the first value to the memory address of the variable occurs. To this end, provision can be made that the second function writes the second value into a memory address of a buffer area, the control instance reads the second value from the memory address of the buffer area, and overwrites the variable with the second value immediately after the writing of the first value by the first function. Alternatively, provision can also be made that the second function writes the second value directly into the memory address of the variable, wherein the control instance is configured to interrupt the processing of the second function by the second computing core immediately before the writing of the second value until the first function has written the first value into the memory address of the variable. In yet another embodiment, a combination of the said features is provided, which is to say that the control instance is configured to choose the second point in time such that the overwriting of the variable with the second value takes place immediately after the writing of the first value by the first function, so that a delay in the processing of the control program is not necessary in general. At the same time, the control instance is configured to delay the processing of the control program by the first computing core if the interval between the first point in time and the third point in time is too short to overwrite the variable with the second value in a timely manner, which is to say before the occurrence of the third point in time.

In an embodiment of the invention, the control instance can be configured to recognize, through a data interface of a processor, write accesses of the control program to variables of the control program, and the control instance can be further configured to write values that have been assigned to variables by a first function or a second function into a buffer area of a memory. For example, it is configured to write an image of an input variable of the second function into a memory address of the buffer area before the start of processing of the second function by the second computing core. In this context, an input variable of a function can be any variable of the control program that is read in by the function in order to use its value to determine a first value or a second value of the variable. Provision is made in this context that the second function reads out the value of the input variable stored in the buffer area. Provision is further made that the control instance ensures that the first function and the second function read in identical values for the same input variables.

In an embodiment, the control instance may be configured to detect, through a data interface of a processor, write accesses of the control program to the input variables of the second function, for example through monitoring of the program counter of the first computing core or through reading out a debugging interface or a trace interface of the processor. Moreover, the control instance is configured to reconstruct all write accesses to the input variables of the second function in a buffer area of the memory, which is to say to write an image of the new value of the input variable into the buffer area for each write access to one of the input variables. It is ensured in this way that a current image of all input variables of the second function is stored in the buffer region of the memory at all times. When processing of the second function is initiated, the control instance interrupts the writing of images of the input variables into the buffer area, and the second function reads the values of the input variables from the buffer area. It is ensured in this way that the first function and the second function read in identical values for the same input variables. It is not possible, for example, for an input variable that is read in both by the first function and by the second function to be overwritten by the first function before the input variable has been read in by the second function. After processing of the second function, the control instance resumes writing images of the input variables of the second function into the buffer area of the memory. It is also preferred for the second function to first write all second values of variables into the buffer area. In this way, it is not possible for the second function to overwrite an input variable of the first function before the first function has read in the value of the input variable.

In an embodiment of the invention, provision is made that the control instance writes a single image of all input variables of the second function into the buffer region immediately before each processing of the second function by the second computing core.

Provision is made according to the invention that the control instance time-coordinates the first point in time, the second point in time, and the third point in time with one another such that the first point in time falls before the second point in time and the second point in time falls before the third point in time. This means that the first function writes the first value of the variable into the memory address of the variable first of all, after that the memory address of the variable is overwritten with the second value, and after that the control program reads in the second value of the variable from the memory address of the variable. For example, the control instance ensures this chronological sequence by the means that the second function writes the second value of the variable into a memory address of the buffer area. The control instance is configured to read the second value of the variable from the memory address of the buffer area, to detect the writing of the first value of the variable by the first function, and, immediately after the writing of the first value by the first function, to overwrite the variable with the second value. In this way it is possible to time-coordinate the first point in time, the second point in time, and the third point in time with one another without delaying the processing of the control program, as long as the interval between the first point in time and the third point in time, which is to say between the writing of the first value of the variable by the first function and the next read-in of the value of the variable by the control program, is sufficiently long to overwrite the variable with the second value within this interval.

In an embodiment of the invention, provision is made to ascertain the length of the interval between the first point in time and the third point in time, for example using a measurement or by using a time estimate on the basis of an analysis of the binary code of the control program, and to make the ascertained length of the interval available to the control instance, wherein the control instance is configured to delay the processing of the control program by the first computing core between the first point in time and the third point in time if the length of the interval falls below a predetermined value, and in this way to increase the length of the interval when necessary.

It is a matter of course that more than one second function can also be stored on the control unit with the use of the method according to the invention. In an embodiment, multiple second functions are stored in order to manipulate multiple first functions in accordance with the method according to the invention. In this embodiment, a priority can be assigned to each second function, and the control instance can control the distribution of the second functions over different computing cores using the different priorities of the second function, in particular in such a way that second functions with high priority are provided with more computing resources than second functions with low priority. In this context, the control instance can be configured to interrupt the processing of a second function in favor of another second function with higher priority in order to make more computing resources available for processing of the other second function.

In an embodiment, multiple second functions are provided in order to manipulate a single first function in alternative ways. For example, provision can be made that all second functions are processed in parallel, each on its own second computing core, wherein each second function assigns the variable a value and the control instance overwrites the variable with one of the multiple second values at the second point in time. For example, every second function can assign a second value to the variable and write the particular second value into a particular address of the buffer area, and the control instance is configured to read a specific value out from the multiple second values stored in the buffer area and to write it into the memory address of the variable at the second point in time. Especially preferably, the control instance chooses the second value using an input from a user, wherein it is possible for the user to change the input at the run time of the processing of the control program by the first computing core, for example using a computer connected to the control unit by means of an interface unit. In this way, it is possible for a user to switch between a number of second functions for manipulating the first function without interrupting the processing of the control program for this purpose. Provision can also be made that multiple second functions are stored in the memory and only a single second computing core is tasked with the processing of one of the multiple second functions, wherein the control instance, using input from a user, initiates the processing of a chosen second function by the second computing core.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
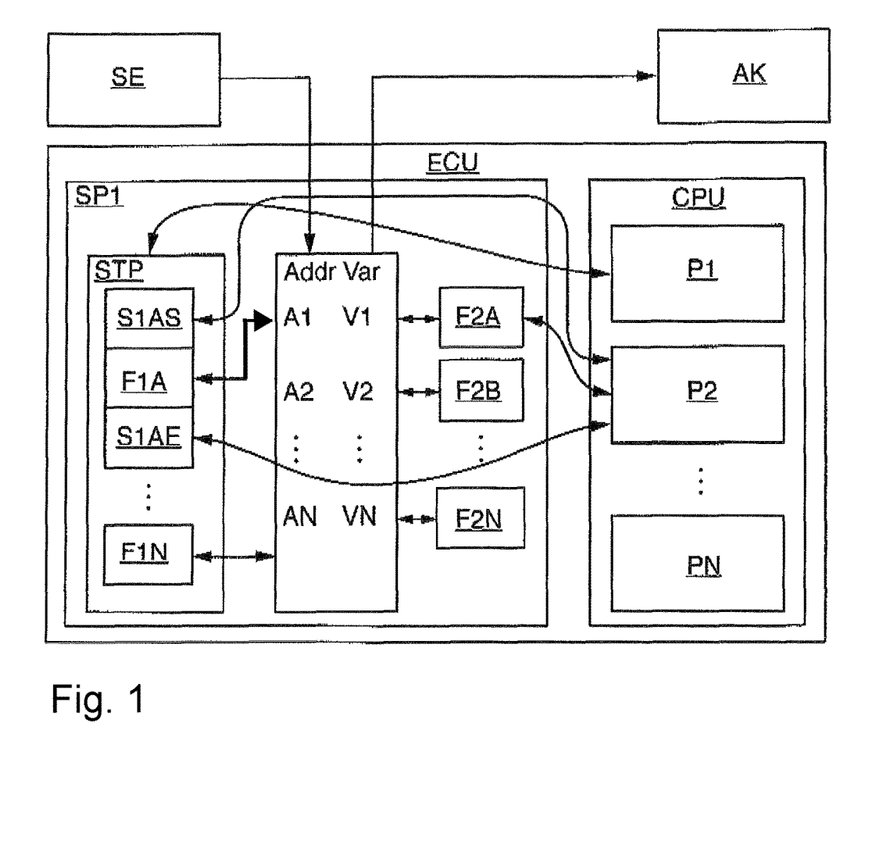
FIG. 1 shows an embodiment according to the invention with the internal structure of a control unit in connection with a sensor and an actuator, and with a control instance implemented as an additional program part.

The illustration in FIG. 1 shows a control unit ECU, having a memory SP1, a processor CPU, a sensor SE that is in operative electrical connection with the control unit ECU, and an actuator AK that is in operative electrical connection with the control unit ECU. The memory SP1 contains a control program STP stored as binary code that comprises a plurality of first functions F1A, F1B, . . . , F1N. The memory SP1 can be composed of different memory types, such as, e.g., volatile memory and read-only memory. The memory SP1 additionally contains a plurality of second functions F2A, F2B, . . . , F2N and a plurality of variables V1, V2, . . . , VN of the control program STP at the memory addresses A1, A2, . . . , AN.

An assignment between the set of first functions F1A, . . . , F1N and the set of second functions F2A, . . . , F2N exists such that each second function F2A, . . . , F2N is provided to manipulate a certain first function F1A, . . . , F1N, wherein the program code distinguishes each second function F2A, . . . , F2N, at least in part, from the first function F1A, . . . , F1N assigned to it in each case. The number of first functions and second functions stored in the memory SP1 generally is not identical. Provision is not made to assign a second function to every first function. Moreover, in one embodiment of the invention, multiple second functions can be assigned to a first function in order to manipulate the first function in alternative ways.

In addition to a first computing core P1 and a second computing core P2, the processor CPU contains an additional plurality of computing cores P3, . . . , PN. In addition, the processor has an interface that is not shown for communication with a monitoring unit—likewise not shown—that is implemented outside the control unit and can be connected to the control unit. In the control unit ECU, the first computing core P1 processes the control program STP. The control program STP is present as binary program code, and comprises a plurality of calls to first functions F1A, . . . , F1N. One task of at least a portion of the first functions F1A, . . . , F1N is to read in data from the sensor SE or to control the actuator AK. Addresses A1, . . . , AN, at which values of variables V1, . . . , VN are stored, are assigned to the functions F1A, . . . , F1N within the memory SP1. The first functions F1A, . . . , F1N contain read or write accesses to the particular variable assigned to them. In other words, the values assigned to the variables are read from the memory addresses A1, . . . , AN assigned to the variables, or a value is written to the relevant memory address.

The first computing core P1 is tasked with the processing of the control program STP. The second computing core P2 is tasked with the processing of a second function F2A, wherein the second function F2A is provided to manipulate a first function F1A of the control program STP.

A control instance coordinates the read and write accesses of the second function F2A to the variables V1, . . . , VN in such a manner that the second function F2A manipulates the first function F1A such that at least one variable V1 written with a first value by the first function F1A is overwritten with a value assigned by the second function F2A, and that furthermore data consistency is ensured. In the embodiment shown in FIG. 1, the control instance is implemented by an additional program part integrated into the control program STP, having a first service routine S1AS and a second service routine S1AE.

The first service routine S1AS is processed by the computing core P1 directly before the first function F1A. It reads in the values of all input variables required for processing of the second function F2A, and stores images of these input variables in a reserved buffer area of the memory SP1 or of another memory that is accessible for the processor CPU. Next, by means of a trigger signal TR it starts processing of the second function F2A by the second computing core P2. After that, the first service routine S1AS terminates, and the first computing core P1 starts processing the first function F1A, while the second computing core P2 processes the second function F2A in parallel. The second function F2A reads in the values of its input variable from the buffer area BU. It is ensured in this way that the first function F1A and the second function F2A read in identical values for identical input variables. It is precluded, for example, that the first function F1A and the second function F2A read in different values for an exemplary input variable V2 because the first function F1A overwrites the memory address A2 of the input variable V2 with a new value even before the second function has read this value. Only the first function F1A accesses the memory address A2, while the second function F2A only accesses the image of the variable V2 stored in the buffer area BU.

The first function F1A assigns a first value to the variable V1 and writes the first variable into the memory address A1. The second function F2A assigns a second value to the variable V1, and writes the second value into a memory address of the buffer area BU. The second service routine S1AE is processed by the processing core P1 immediately after the first function F1A. It reads the second value of the variable V1 assigned by the second function F2A from the buffer area and writes the second value into the address A1, in which process the first value assigned by the first function F1A is overwritten. When necessary, the second service routine waits until the second function F2A has assigned a second value to the variable V1 and written the second value into the buffer area. After that, the second service routine S1AE, by means of a trigger signal TR, terminates the processing of the second function F2A by the second computing core P2.

After that, the second service routine S1AE terminates, and the first computing core P1 continues processing of the control program STP. At the next read access to the memory address A1 of the variable V1, the control program reads the second value assigned by the second function F2A. If the variable V1 defines the behavior of the actuator AK, then the actuator AK will be controlled by the second function F2A instead of by the first function F1A.

It is a matter of course that the method can also be applied in the same way to a plurality of variables V1, . . . , VN.

Figure 2:
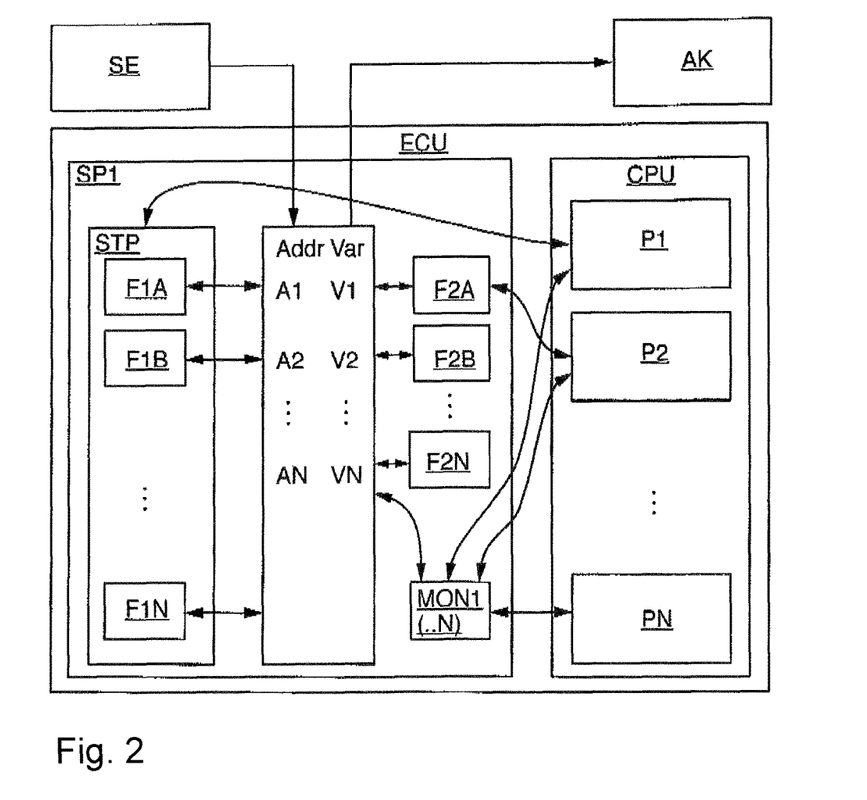
FIG. 2 shows an embodiment according to the invention with the internal structure of a control unit with a control instance implemented as a monitoring program.

The illustration in FIG. 2 shows a second embodiment of the method according to the invention. Only the differences from the depiction in FIG. 1 are explained below. The control instance is implemented as a monitoring program MON1 in the memory SP1, and is processed by a third computing core PN.

Because the monitoring program MON1, unlike the service routines S1AS, S1AE shown in FIG. 1, is not integrated into the control program STP, in order to be able to time-coordinate the variable accesses of the control program STP and the second function F2A, the monitoring program MON1 must be configured to monitor the processing of the control program STP by the first computing core P1 and to detect calls or running processing of first functions F1A, . . . , F1N as well as accesses to variables V1, . . . , VN. This preferably occurs by means of a data interface of the processor CPU, in particular a debugging interface, a trace interface, or an interface for reading out the program counter of the first computing core P1.

The monitoring program MON1 is configured to detect write accesses of the control program STP to the memory address A2 of the input variable V2 of the second function F2A, and it is additionally configured to write an image of the new value of the input variable V2 into the buffer area BU after a write access of the control program STP to the memory address A2. Preferably the monitoring program MON1 writes an image of the input variable V2 into the buffer area BU immediately after every write access of the control program STP to the memory address A2 of the input variable V2, so that a current image of the input variable V2 is present there at all times. The monitoring program MON1 is additionally configured to detect calls to first functions F1A, . . . , F1N or returns from first functions F1A, . . . , F1N by the first computing core, and to start processing of the second function F2A by the second computing core upon the start of processing of the first function F1A by the first computing core P1. Preferably, the monitoring program MON1 starts the second function F2A by means of a trigger signal TR.

After the second function F2A has stored the second value of the variable V1 in the buffer area BU, the monitoring program MON1 reads the second value from the buffer area BU. The monitoring program MON1 is additionally configured to detect the writing of the memory address A1 of the variable V1 with the first value of the variable V1 by the first function F1A, and to overwrite the memory address A1 of the variable V1 with the second value immediately after the writing with the first value.

It should be noted that, in one possible embodiment of the invention, a multiplicity of monitoring programs MON1, MON2, . . . , MONN are provided corresponding to the multiplicity of second functions F2A, F2B, . . . , F2N, wherein the multiple monitoring programs MON1, . . . , MONN can each run on different processor cores.

One advantage of the embodiment shown in FIG. 2 is that it can be used flexibly on every first function F1A, . . . , F1N and does not require manipulation of the binary code of the control program STP, whereas the service routines S1AE, S2AE shown in FIG. 1 either must already be implemented in the source code of the control program STP or must be inserted into the control program STP later through manipulation of the binary code of the control program STP.

Figure 3:
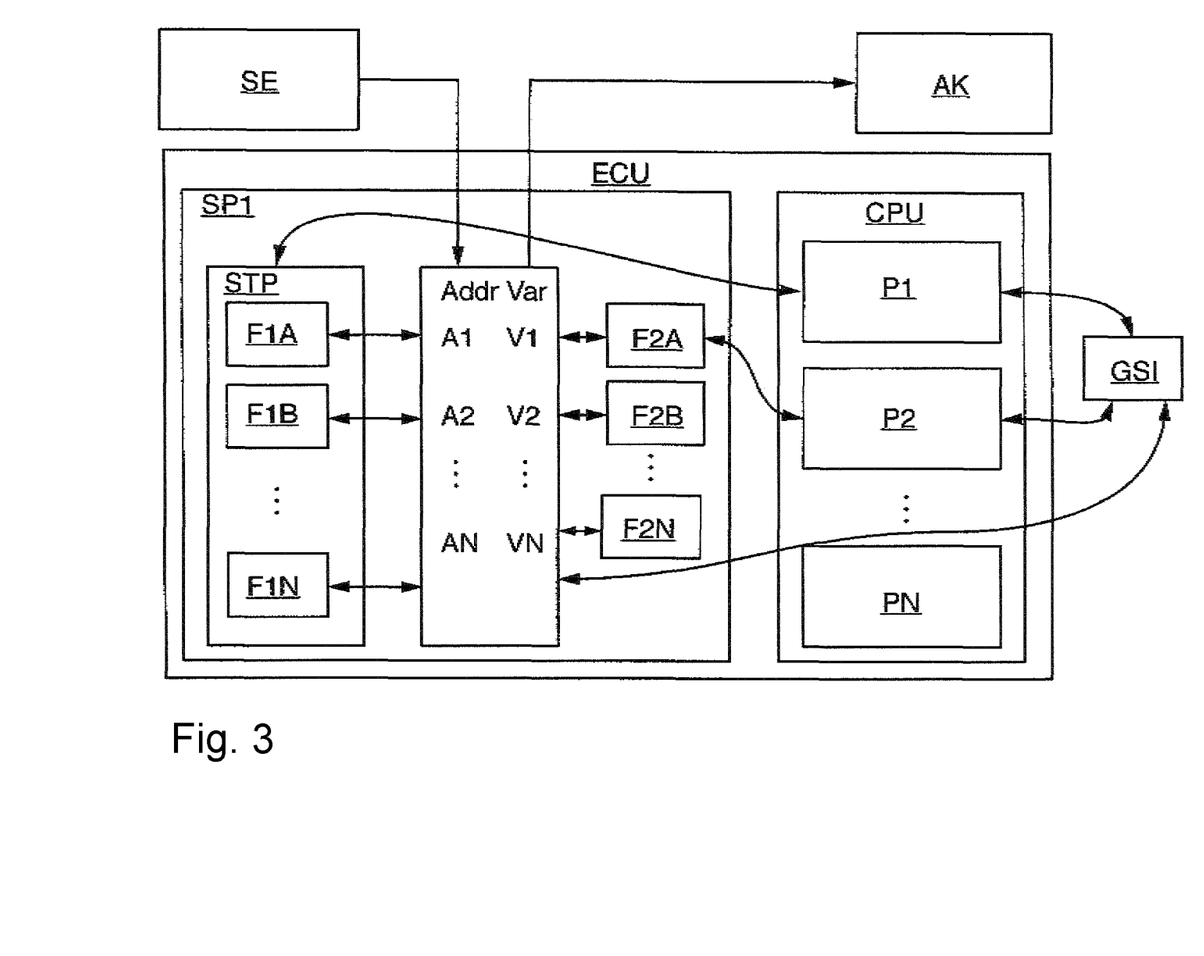
FIG. 3 shows an embodiment according to the invention with the internal structure of a control unit with a control instance implemented as a monitoring unit.

The illustration in FIG. 3 shows a third embodiment of the method according to the invention. Only the differences from the depiction in FIG. 1 and FIG. 2 are explained below. The control instance is implemented as a monitoring unit GSI that is arranged outside the control unit ECU and can be connected to the control unit ECU. The functionality of the monitoring unit GSI corresponds to the functionality of the monitoring program MON1 shown in FIG. 2. This means that the monitoring unit GSI is configured to detect, by means of a data interface of the processor CPU, calls, terminations, or processing in progress of a first function F1A by the first computing core, and it preferably is also configured to detect write and read accesses to the memory addresses A1, . . . , AN of variables V1, . . . , VN of the control program STP. In so doing, the monitoring unit processes a program routine whose functionality corresponds to the monitoring program MON1 shown in FIG. 2. In one possible embodiment in this context, the program routine can be processed by a computing core built into the monitoring unit GSI. In another possible embodiment, the program routine is implemented on the monitoring unit GSI as hardware, for example by an FPGA.

Especially preferably, the monitoring unit GSI is configured as an interface unit that makes it possible to connect the control unit ECU to a computer system arranged outside the control unit ECU, for example to a PC or to rapid prototyping hardware, and to control or manipulate the control unit ECU from this computer system.

Figure 4:
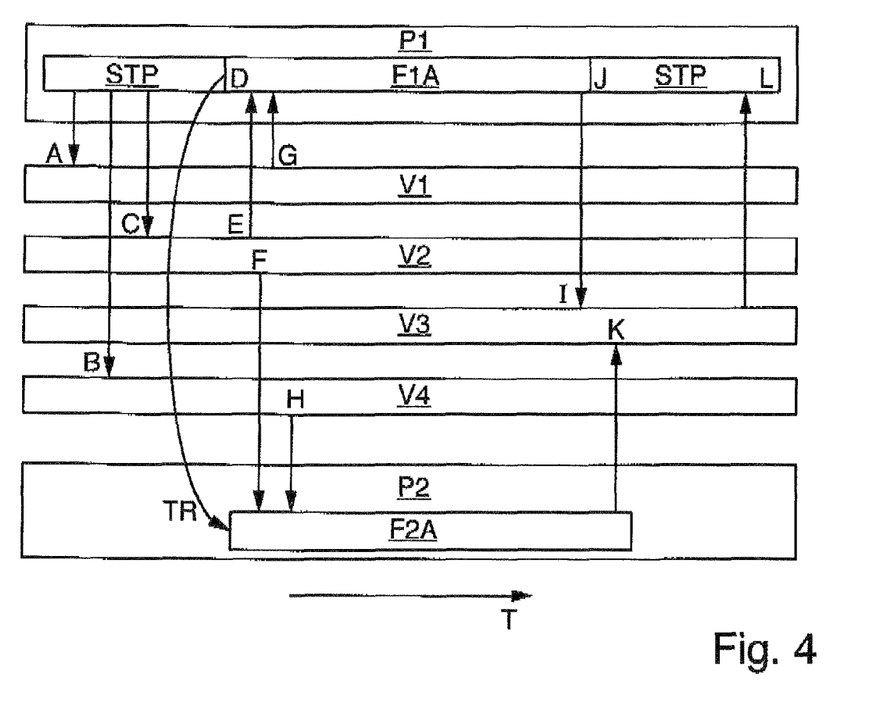
FIG. 4 shows a representation of the method according to the invention in the form of a timing diagram with different read and write accesses to variables.

The illustration in FIG. 4 illustrates the steps of the method according to the invention using a timeline. Events in the control unit ECU are arranged chronologically from left to right in accordance with the time axis T shown, which is to say that the further to the right the events are shown, the later they occur. In the following descriptions, the events are labeled in alphabetical order according to their position on the time axis. Thus, their alphabetic sort corresponds to their chronological sequence in the illustration, and events with the same alphabetic label are sorted numerically in accordance with their chronological sequence. For example, an event labeled B takes place later than an event labeled A, and an event labeled A2 takes place later than an event labeled A1.

A first computing core P1 processes a control program STP with a first function F1A, and a second computing core P2 processes a second function F2A. At a point in time A, the control program STP writes a first variable V1, which is to say it writes a new value of the first variable V1 into the memory address A1. In addition, at a point in time B it writes a fourth variable V4, and at a point in time C it writes a second variable V2, before it calls the first function F1A at a point in time D. Simultaneously with the call of the first function F1A, the processing of the second function F2A by the second computing core P2 is initiated by means of a trigger signal TR.

Both the first function F1A and the second function F2A read in the value of the variable V2 as an input variable at different points in time E, F. In addition, the first function F1A reads in the value of the variable V1 as an input variable at a point in time G, and the second function F2A reads in the value of the variable V4 as an input variable at a point in time H. Both functions then assign a value to the variable V3. The first function F1A writes a first value of the variable V3 into the memory address A3 at a first point in time I. At a point in time J, the return from the first function F1A takes place, which is to say the first function F1A is terminated and the processing of the control program STP by the first computing core P1 is continued. At a point in time K, the second function F2A writes a second value for the variable V3 into the memory address A3 of the variable V3, and in so doing overwrites the value written by the first function F1A. At a point in time L, the control program reads in the second value of the variable V3 written by the second function F2A.

In the illustration shown, the variable V2 is an input variable for both the first function F1A and for the second function F2A. In order to maintain data consistency, the control instance must therefore ensure that both functions F1A, F2A read in identical values for the variable V2. Moreover, the control instance must ensure that the point in time K occurs after the point in time I, but before the point in time L, so that, at the point in time L, the control program STP reads in the second value for the third variable V3 assigned by the second function F2A.

Figure 5:
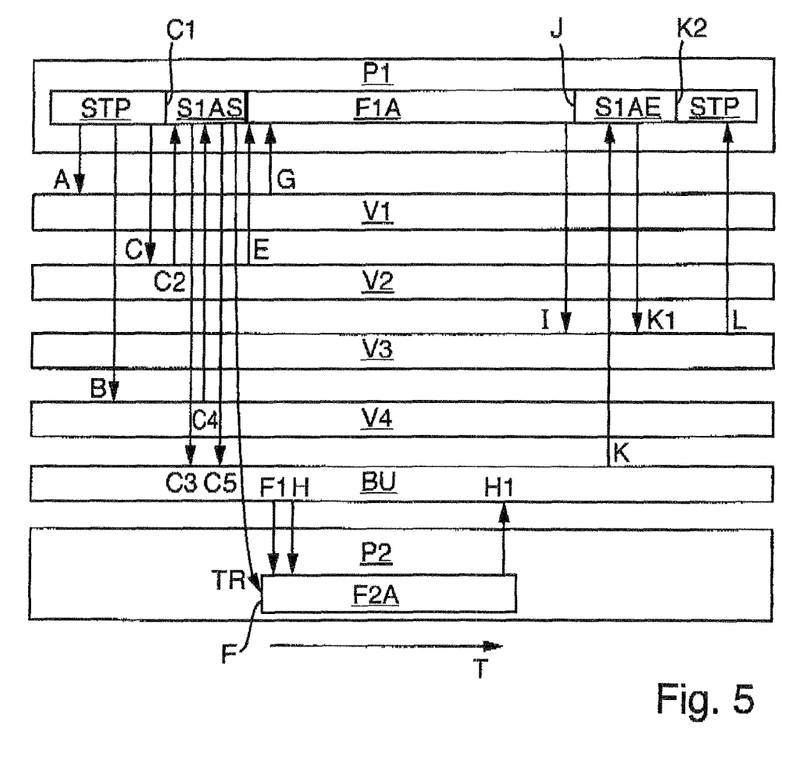
FIG. 5 shows an embodiment of the method according to the invention in the form of a timing diagram, with a control instance implemented as an additional program part.

In another timing diagram, the illustration in FIG. 5 shows the method steps corresponding to the embodiment shown in FIG. 1. Only the differences from the depiction in FIG. 4 are explained below. Immediately before processing of the first function F1A, the first computing core P1 processes a first service routine S1AS, and immediately after processing of the first function F1A it processes a second service routine S1AE. In addition, a buffer area BU for storing first or second values of variables V1, . . . , V4 is provided. At a point in time C1, the first computing core starts processing of the first service routine S1AS, which thereafter reads in the values of the input variables V2, V4 of the second function F2A and stores them in the buffer area BU. At a point in time C2, it reads the value of the first input variable V2 from the memory address A2 and writes its value immediately thereafter, at a point in time C3, into the buffer area BU. At a point in time C4, it reads the value of the second input variable V4 from the memory address A4, and writes it immediately thereafter, at a point in time C5, likewise into the buffer area BU. At a point in time F, the first service routine S1AS initiates the processing of the second function F2A by the second computing core P2 by means of a trigger signal TR. Immediately thereafter, the return from the first service routine S1AS takes place, and the first computing core P1 starts processing of the first function F1A. The first function F1A and the second function F2A thus start virtually simultaneously, and are processed in parallel thereafter.

At the points in time F1 and H, the second function F2A reads the values of its input variables V2, V4 out from the buffer area BU, assigns thereafter a second value to the variable V3, and writes the second value into the buffer area BU at a point in time H1. At a point in time I, the first function F1A writes a first value for the variable V3, assigned by the first function F1A, into the memory address A3. At a point in time J, the first function F1A is terminated and the first computing core starts the processing of the second service routine S1AE. This routine, at a point in time K, reads the second value for the variable V3 stored by the second function F2A in the buffer area BU, and at a point in time K1 writes this value into the memory address A3 of the variable V3. After that, the second service routine S1AE terminates at a point in time K2, and the first computing core P1 continues processing of the control program STP, which, at a point in time L, reads from the memory address A3 the second value for the third variable V3 that was stored by the second service routine S1AE and assigned by the second function F2A.

Figure 6:
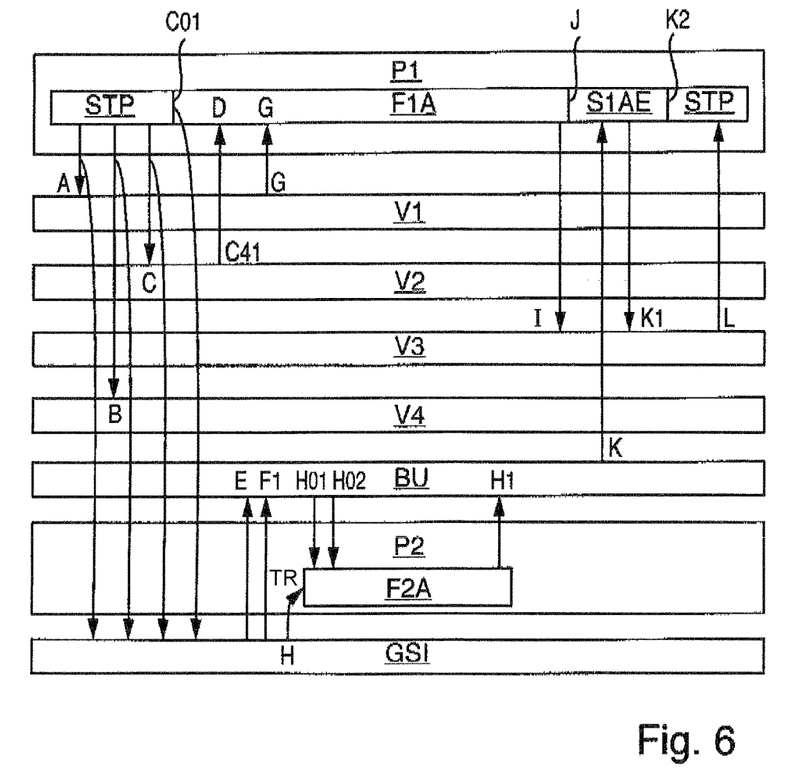
FIG. 6 shows an embodiment of the method according to the invention in the form of a timing diagram, with a control instance implemented as a combination of additional program part and monitoring unit.

The illustration in FIG. 6 shows a timing diagram for another exemplary embodiment that was not shown in the preceding figures, in which the control instance is implemented through a combination of a monitoring unit GSI that can be connected to the control unit and an additional program part in the form of a service routine S1AE. Preferably the monitoring unit GSI is implemented as an interface element, and the service routine S1AE is integrated into the binary code of the control program STP by means of the monitoring unit GSI and a computer connected to the control unit ECU by means of the monitoring unit GSI. Only the differences from FIGS. 4 and 5 are explained below.

The monitoring unit GSI is configured to detect write accesses of the control program STP to variables V1, . . . , V4 as well as calls to first functions F1A, . . . , F1N by the first computing core P1. All write accesses of the control program STP to variables at the points in time A, B, and C are detected, and the new values of the variables in each case are stored in an internal memory of the monitoring unit GSI so that a current image of all variables V1, . . . , V4 of the control program STP is stored in the internal memory of the monitoring unit GSI at all times. At a point in time C01, the first computing core calls the first function F1A. This call to the first function F1A is detected by the monitoring unit GSI. Immediately after it has detected the call to the function F1A, the monitoring unit interrupts the storage of new values of variables V1, . . . , V4 in its internal memory, and at the points in time E and F1 writes the current values of the input variables V2, V4 of the second function F2A into the buffer area BU. After the values of all input variables V2, V4 of the second function F2A have been stored in the buffer area BU, the monitoring unit GSI initiates, by means of a trigger signal TR, the processing of the second function F2A by the second computing core P2. The second function F2A reads in the values of its input variables V2, V4 from the buffer area BU at the points in time H01 and H02. In this way, the first function F1A and the second function F2A read in identical values for the input variable V2 that they use in common.

In another possible embodiment, the monitoring unit GSI writes the values of each of the input variables V2, V4 of the second function F2A immediately after each write access of the control program to the input variables V2, V4 in the buffer area BU, and interrupts the writing of the values of the input variables V2, V4 into the buffer area immediately after the first function F1A is called, so that a current image of the input variables V2, V4 of the second function F2A is present in the buffer area BU at all times until the first function F1A is called.

The second function F2A assigns a second value to the variable V3, and writes this value into the buffer area BU at a point in time H1. At a point in time K, the service routine S1AE reads the second value and, at a point in time K1, writes it into the memory address A3 of the variable V3. In so doing, it overwrites the first value written by the first function F1A at the point in time I.

Figure 7:
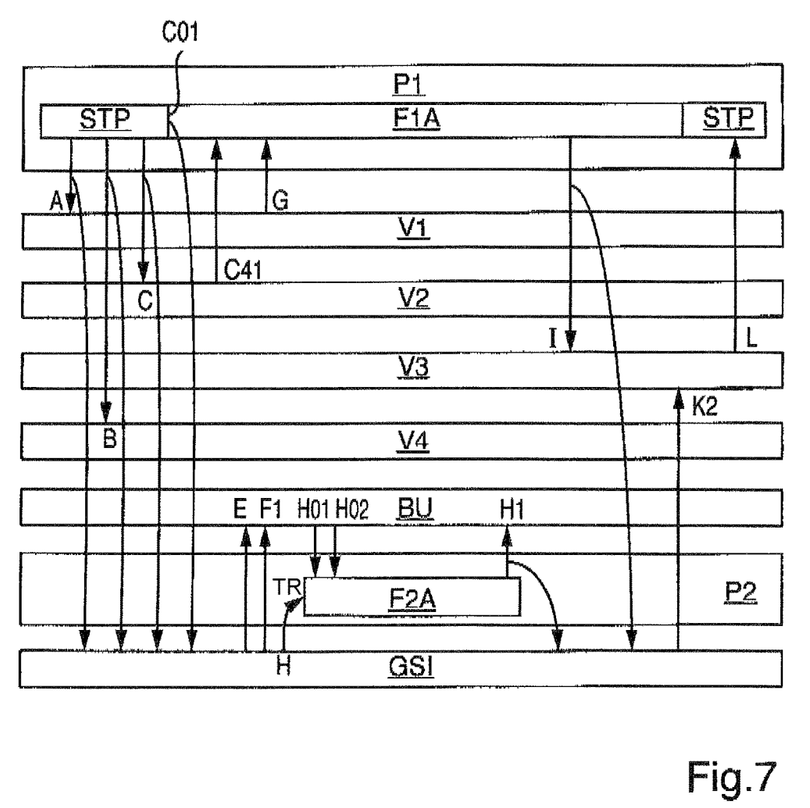
FIG. 7 shows an embodiment of the method according to the invention in the form of a timing diagram, with a control instance implemented as a monitoring unit.

In another timing diagram, the illustration in FIG. 7 shows the method steps corresponding to the embodiment shown in FIG. 3. Only the differences from the depiction in FIGS. 4 to 6 are explained below. The control instance is implemented by a monitoring unit GSI. At a point in time H1, the second function F2A writes the second value of the variable V3 into the buffer area BU. The monitoring unit GSI detects this write access and writes an image of the second value of the variable V3 stored in the buffer area BU into its internal memory. At the point in time I, the first function F1A writes a first value of the variable V3 into the memory address A3 of the variable V3. The monitoring unit GSI detects this write access as well, and immediately after the first function F1A has written the first value of the variable V3 into the memory address A3, the monitoring unit GSI writes the second value of the variable into the memory address A3 at a point in time K2, and in so doing overwrites the first value stored there by the first function F1A.

It should be noted that the functionality of the monitoring unit GSI shown in FIGS. 6 and 7 can be replaced in whole or in part by a monitoring program MON1 stored on the control unit ECU.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manipulating a control program of a control unit, the control unit having a first memory for accommodating the control program, and the control program having a plurality of first functions, at least one of the first functions controlling an actuator, the method comprising:
   providing a plurality of variables;
   assigning a memory address to each of the variables, a predefined assignment being implemented between the variables and the first functions;
   providing the control unit with at least one processor, the at least one processor of the control unit having a plurality of computing cores;
   executing the control program with the first functions by a first computing core;
   processing, during the processing of the control program, a second function in a second computing core of the control unit;
   assigning a first function a first value to a variable and writing the first value into the memory address of the variable at a first point in time; and
   assigning the second function a second value to the variable, the variable being overwritten with the second variable at a second point in time, the control program accessing the modified value of the variable at a third point in time,
   wherein the second function has program code that is different at least in part from the first function, and
   wherein a control instance time-coordinates the accesses to the memory address of the variable with one another such that the first point in time falls before the second point in time and the second point in time falls before the third point in time.

2. The method according to claim 1, wherein the control instance is implemented in part or in whole through a monitoring program, and wherein the monitoring program is processed on a different computing core from the first computing core or on a computing core arranged outside the control unit or through an additional program part supplementing the control program.

3. The method according to claim 1, wherein the control instance is implemented in part or in whole through a monitoring unit that is connectable to the control unit or a monitoring unit configured as an interface unit.

4. The method according to claim 1, wherein, by monitoring a data interface of a processor or an interface for reading out a program counter, a trace interface, or a debugging interface, the control instance is configured to detect calls, processing in progress or terminations of functions of the control program by the first computing core.

5. The method according to claim 4, wherein the control instance causes the variable to be overwritten with the second value after termination of the first function.

6. The method according to claim 1, wherein the processing of the second function is initiated through a trigger signal or through a setting of the program counter of the second computing core.

7. The method according to claim 4, wherein the control instance initiates the processing of the second function by the second computing core immediately after the call to the first function by the first computing core or immediately after termination of the function of the control program preceding the first function or immediately after recognition of processing in progress of the first function by the first computing core.

8. The method according to claim 1, wherein the processing of the second function is processed in parallel on multiple second computing cores, or wherein the control instance controls the distribution of the second function over one or more computing cores.

9. The method according to claim 1, wherein the control instance ensures, using a delay of the control program or using the choice of the second point in time, that the third point in time falls after the second point in time.

10. The method according to claim 1, wherein the control instance is configured to detect, through a data interface of a processor, an interface for reading out a program counter, a trace interface, or a debugging interface, configured to write accesses of the control program to variables, and configured to write a first value or a second value of at least one variable into a memory address of a buffer area.

11. The method according to claim 10, wherein the control instance writes an image of an input variable of the second function into a memory address of the buffer area before the start of processing of the second function by the second computing core, wherein the second function reads out the value of the input variable from the memory address of the buffer area, and wherein the control instance ensures that the first function and the second function read in identical values for the input variable.

12. The method according to claim 11, wherein the control instance is configured to detect, through a data interface of a processor or an interface for reading out a program counter, a trace interface, or a debugging interface, configured to write accesses of the control program to the input variable of the second function, and after a write access of the control program to the input variable, to write an image of the input variable into the memory address of the buffer area, and wherein the control instance interrupts the writing of the image of the input variable into the buffer area during the processing of the second function by the second computing core.

13. The method according to claim 10, wherein the second function writes the second value of the variable into a memory address of the buffer area, the control instance detects the writing of the first value of the variable at the memory address of the variable by the first function, and, after the writing of the first value of the variable by the first function, the control instance overwrites the memory address of the variable with the second value of the variable stored in the buffer area or overwrites it immediately after writing the first value.

14. The method according to claim 13, further comprising: ascertaining a value for the length of the interval between the first point in time and the third point in time, using a measurement or an analysis of the binary code of the control program, wherein the control instance is configured to delay the processing of the control program between the first point in time and the third point in time if the estimated interval falls below a predetermined length.

15. The method according to claim 1, wherein multiple second functions are provided.

16. The method according to claim 15, wherein the multiple second functions have different priorities, and a distribution of the second functions over one or more computing cores using the different priorities of the second functions is controlled by the control instance, and wherein the control instance is configured to pause a second function that is being processed by a second computing core and to have the second computing core process a different second function with higher priority.

17. The method according to claim 15, wherein the multiple second functions each assign different second values to the variable, and wherein the control instance is configured to overwrite the variable with one of the different second values at the second point in time.

* * * * *